(12) United States Patent
Shiozawa et al.

(10) Patent No.: US 8,389,052 B2
(45) Date of Patent: Mar. 5, 2013

(54) METHOD FOR TREATING INSIDE SURFACE OF GLASS CONTAINER AND GLASS CONTAINER

(75) Inventors: Kazuyuki Shiozawa, Kanagawa (JP); Yasuhiro Gogun, Kanagawa (JP)

(73) Assignee: Toyo Glass Co., Ltd., Tokyo (JP)

( * ) Notice: Subject to any disclaimer, the term of this patent is extended or adjusted under 35 U.S.C. 154(b) by 20 days.

(21) Appl. No.: 13/120,485

(22) PCT Filed: Jan. 18, 2011

(86) PCT No.: PCT/JP2011/050726
§ 371 (c)(1),
(2), (4) Date: Mar. 23, 2011

(87) PCT Pub. No.: WO2011/122067
PCT Pub. Date: Jun. 10, 2011

(65) Prior Publication Data
US 2011/0244153 A1    Oct. 6, 2011

(30) Foreign Application Priority Data

Mar. 30, 2010  (JP) .................................. 2010-079086
Apr. 7, 2010   (JP) .................................. 2010-088483

(51) Int. Cl.
*C03C 17/34*     (2006.01)
*B65D 23/02*     (2006.01)
(52) U.S. Cl. .......................... 427/231; 427/237; 427/384
(58) Field of Classification Search .......... 427/230–239, 427/372.2, 384, 389.7; 528/10–43
See application file for complete search history.

(56) References Cited

FOREIGN PATENT DOCUMENTS

| JP | 61-236635    | 10/1986 |
| JP | 2-153847     | 6/1990  |
| JP | 5-105486     | 4/1993  |
| JP | 11-29148     | 2/1999  |
| JP | 2000-72491   | 3/2000  |
| JP | 2002-173764  | 6/2002  |
| JP | 2005-170736  | 6/2005  |
| JP | 2008-81153   | 4/2008  |

OTHER PUBLICATIONS

International Search Report issued May 10, 2011 in International (PCT) Application No. PCT/JP2011/050726, together with English translation thereof.
Written Opinion issued May 10, 2011 in International (PCT) Application No. PCT/JP2011/050726, together with English translation thereof.

*Primary Examiner* — William Phillip Fletcher, III
(74) *Attorney, Agent, or Firm* — Wenderoth, Lind & Ponack, L.L.P.

(57) ABSTRACT

A method for treating the inside surface of a glass container includes applying a polysilazane solution to the inside surface of the glass container, drying the polysilazane while the glass container is rotated in the state of being inverted and inclined 50° to 70° with respect to horizontal, and sintering the polysilazane. During the sintering, the sintering temperature is 300° C. to 600° C. and the sintering time is 10 minutes or more. The method may also include applying at least one of a sulfur dioxide gas, a sulfur trioxide gas, a chlorine gas, and a chlorofluorocarbon gas to the inside surface of the glass container under heating, during which the average temperature of the glass container may be 500° C. to 700° C.

8 Claims, 11 Drawing Sheets

FIG.8 RESULT OF ALKALI ELUTION TEST

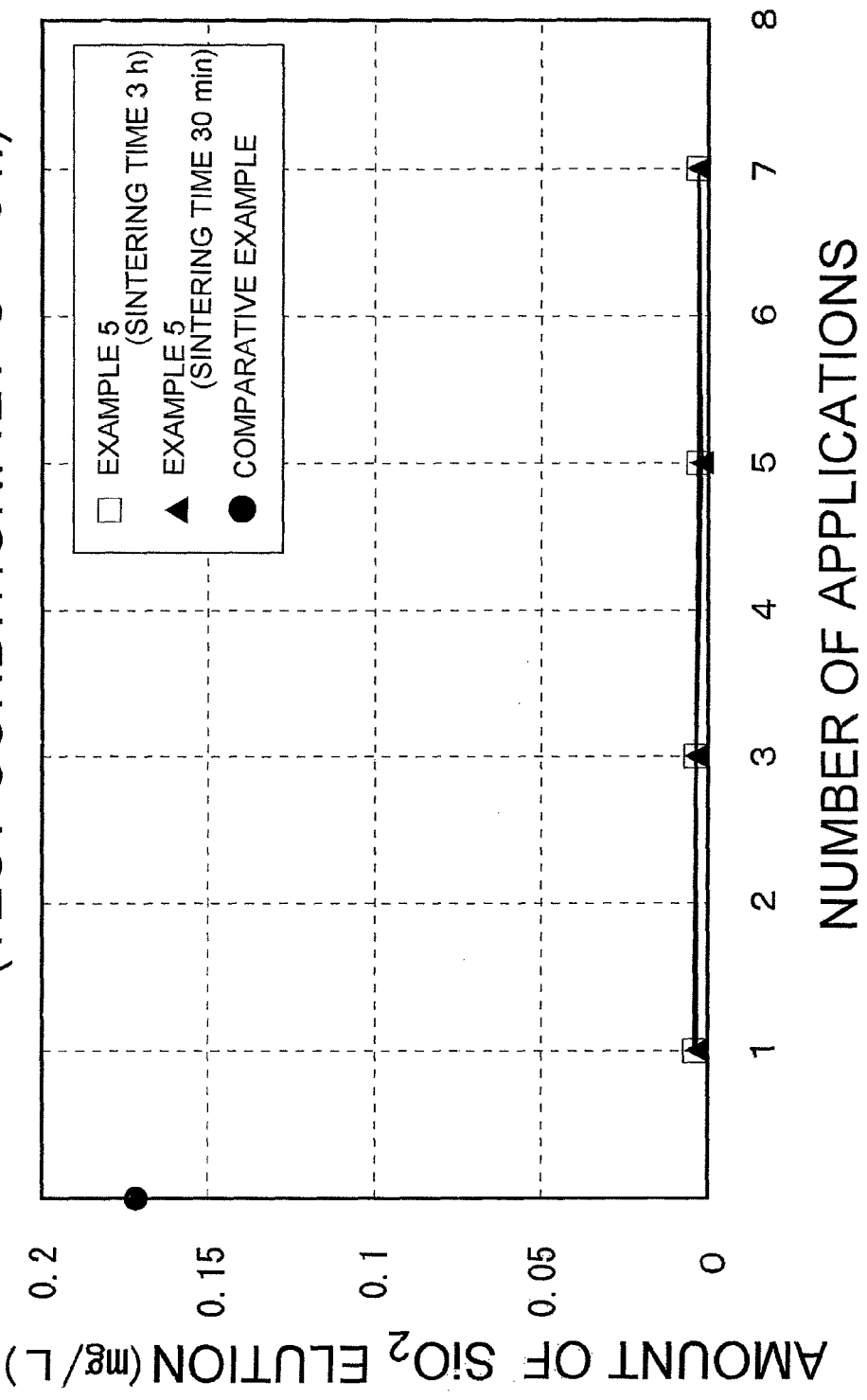

METHOD FOR TREATING INSIDE SURFACE OF GLASS CONTAINER AND GLASS CONTAINER

TECHNICAL FIELD

The present invention relates to a glass container favorably primarily used for storing chemicals and a method for treating the inside surface thereof.

BACKGROUND ART

Regarding a glass container for chemicals at present, elution of an alkali into contents is restrained by a dealkalization treatment of the glass through a sulfur dioxide gas or chlorofluorocarbon gas treatment.

The dealkalization treatment, in which a sulfur dioxide gas, a sulfur trioxide gas, or a chlorine gas is applied to a glass container under heating, is referred to as a bloom treatment and is disclosed in, for example, PTLs 1 and 2 described below.

The dealkalization treatment (chlorofluorocarbon gas treatment), in which a chlorofluorocarbon gas is applied to a glass container under heating, is disclosed in, for example, PTL 3 described below.

Furthermore, the dealkalization treatment by combining the above-described bloom treatment and the chlorofluorocarbon gas treatment is disclosed in, for example, PTLs 4 and 5 described below.

Moreover, PTL 6 described below discloses a technology in which polysilazane is applied to the surface of a glass substrate to form a silica based coating serving as an alkali passivation film.

CITATION LIST

Patent Literature

PTL 1: Japanese Unexamined Patent Application Publication No. 2000-72491
PTL 2: Japanese Unexamined Patent Application Publication No. 2-153847
PTL 3: Japanese Unexamined Patent Application Publication No. 2005-170736
PTL 4: Japanese Unexamined Patent Application Publication No. 61-236635
PTL 5: Japanese Unexamined Patent Application Publication No. 11-29148
PTL 6: Japanese Unexamined Patent Application Publication No. 5-105486

SUMMARY OF INVENTION

Technical Problem

Regarding glass containers for chemicals, restraint of alkali elution from the glass container has been desired to exceed the performance at present in association with upgrading the required quality and improving the accuracy of an analyzer.

The above-described combination of the bloom treatment and the chlorofluorocarbon gas treatment can reduce the usage of a sulfur dioxide gas significantly. However, a dealkalization effect is slightly larger than or equal to that of the bloom treatment only and, therefore, an effect of restraining alkali elution is insufficient.

It is an object of the present invention to reduce the amount of alkali elution from the inside surface of a glass container to a greater extent than ever.

For that purpose, it is effective to form a silica based coating by applying polysilazane to the inside surface of the glass container and performing sintering after drying.

However, in the case where polysilazane is applied to the inside surface of the glass container, the film thickness of the applied coating does not become uniform, a thick film portion, where the coating is applied thick, is generated, and the thick film portion foams during heating. Therefore, commercialization has not been achieved.

As shown in FIG. 1, in the case where polysilazane is applied to the inside surface of the glass container, the periphery of the bottom portion becomes a large thickness portion 4 where polysilazane has adhered with a large thickness and the resulting large thickness portion 4 foams during sintering.

In addition, in the case where polysilazane is applied and, thereafter, as shown in FIG. 2, an inverted state is brought about, the large thickness portion 4 is formed at the center of the bottom, as shown in FIG. 3, and the resulting large thickness portion 4 foams during sintering.

It is also an object of the present invention to prevent foaming of polysilazane applied to the inside surface of the glass container during sintering.

Solution to Problem

The present invention is a method for treating the inside surface of a glass container characterized by including the steps of applying a polysilazane solution to the inside surface of the glass container, drying polysilazane while the glass container in the state of being inverted and inclined 50° to 70° is rotated, and sintering polysilazane.

It is desirable that the drying of polysilazane while the glass container in the state of being inverted and inclined 50° to 70° is rotated is performed at ambient temperature. After this step, the inside surface of a mouth portion of the glass container may be covered with polysilazane thick in some cases. At that time, wiping with a cloth or the like may be performed. After this drying at ambient temperature, it is desirable that drying at high temperature is performed (at about 100° C. to 180° C. for about 5 to 15 minutes). The drying time can be reduced by performing high-temperature drying.

A compound having a (Si—N) bond is referred to as silazane. Polysilazane is an inorganic polymer which has

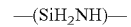

as a basic unit and which is soluble in an organic solvent. An example of molecular structures thereof is shown in the upper column in FIG. 4. It is believed that in the case where this is sintered in the air, a silicon dioxide coating shown in the lower column in FIG. 4 is formed through a reaction represented by

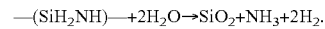

The polysilazane solution is a solution in which polysilazane is diluted with an organic solvent, e.g., xylene, and it is appropriate that the concentration thereof is about 0.5 to 7 percent by weight.

As shown in FIG. 5, polysilazane is dried while the glass container in the state of being inverted and inclined at θ=50° to 70° is rotated and, thereby, generation of a large thickness portion in polysilazane applied can be prevented and foaming of polysilazane coating can be prevented during sintering.

In the case where the glass container comes into the state of being inverted and inclined 50° to 70°, an excess polysilazane solution in the inside of the container drips from the mouth portion of the container. This dripping continues for about 15 minutes and, therefore, the time of keeping the container in this state is specified to be 15 minutes or more, and preferably 20 minutes or more.

In this case, a large thickness portion of polysilazane layer may be generated on the inside surface 5 of the mouth portion of the glass container. At that time, the thickness of the polysilazane layer can be reduced by wiping the mouth portion of the container with a cloth or the like. The operation to wipe the inside surface of the mouth portion of the container is performed easily.

If the angle of the glass container is less than 50°, as shown in FIG. 6, a large thickness portion 4 may be generated on the inside surface of the shoulder portion of the container. If 70° is exceeded, a large thickness portion is generated on the bottom potion of the container.

The rotation of the glass container may be continuous rotation at a constant angular velocity or be intermittent rotation (for example, 90° at five-minute intervals). However, it is desirable that at least 1 rotation (360°) is made before dripping of an excess solution is completed.

Any device is employed to rotatably hold the glass container in the state of being inverted and inclined 50° to 70°, and there is no specific limitation.

Furthermore, the present invention is a method for treating the inside surface of a glass container characterized by including the steps of washing the inside of the glass container with water, an acid solution, or an organic solvent, applying a polysilazane solution to the inside surface of the glass container, drying polysilazane while the glass container in the state of being inverted and inclined 50° to 70° is rotated, and sintering polysilazane.

It is desirable that the drying of polysilazane while the glass container in the state of being inverted and inclined 50° to 70° is rotated is performed at ambient temperature. After this step, the inside surface of a mouth portion of the glass container may be covered with polysilazane thick in some cases. At that time, wiping with a cloth or the like may be performed. After this drying at ambient temperature, it is desirable that drying at high temperature is performed (at about 100° C. to 180° C. for about 5 to 15 minutes). The drying time can be reduced by performing high-temperature drying.

An alkali elution restraining effect is improved to a great extent by combining the washing of the inside surface of the glass container and the polysilazane treatment.

The alkali elution restraining effect is poor when the inside surface of the glass container is subjected to the polysilazane treatment only. The reasons for this are believed to be that large amounts of alkali present on the surface of a base material before the polysilazane coating becomes a dense coating diffuses into the polysilazane coating during formation of the coating and that a high-concentration alkali is present on the surface of the base material, the amount of diffusion into the formed silica based coating thereby increases and, as a result, the alkali is eluted.

In the case where the washing step with water or the like is performed, the alkali on the base material surface is reduced and, therefore, the alkali does not diffuse into the polysilazane coating during formation of the coating, so that the amount of diffusion into the formed silica based coating decreases and, as a result, the alkali elution is restrained.

In the case where the inside surface of the glass container is washed with water, the washing method is not specifically limited. For example, washing can be performed as shown in FIG. 7.

In FIG. 7, a water supply pipe 2 is inserted into the inside of a glass container 1 in the state of being erected or inverted, and water is gushed out from the end portion thereof. The water becomes a water stream as indicated by arrows and washes the inside surface of the container until being discharged from the mouth portion of the container.

It is desirable that the amount of washing water (preferably pure water) fed into the container is at least two times the volume of the container. This is for the purpose of preventing the alkali, which is eluted into the washing water due to washing, from remaining on the inside surface of the container.

The pure water is distilled water, ion-exchanged water, ultrafiltration water (reverse osmosis membrane filtration water), or water produced by combining these methods.

After the washing, the polysilazane solution is applied to the inside surface of the glass container. This operation is performed in the state in which the washing water on the inside surface of the container is dried completely.

Dealkalization in the vicinity of the glass surface can be facilitated by washing the inside surface of the glass container with the acid solution.

Examples of acid solutions include hydrochloric acid, sulfuric acid, nitric acid, phosphoric acid, boric acid, hydrofluoric acid, iodic acid, and carbonic acid.

It is appropriate that the concentration of the acid solution is about 0.5 to 2 percent by mole.

The amount of the washing acid solution may be small, and it is enough that the amount is sufficient for the whole inside surface of the container to come into contact with the acid solution.

After the washing with the acid solution, the inside of the glass container is washed with pure water. At that time, it is desirable that the amount of the pure water is specified to be at least two times the volume of the container.

Dealkalization in the vicinity of the glass surface can be facilitated by washing the inside surface of the glass container with the organic solvent having a polar group.

Examples of polar groups include a hydroxyl group, a carboxyl group, and a ketone group.

Examples of solvents having a hydroxyl group (OH group) include alcohols, e.g., methanol, ethanol, propanol, phenol, glycerin, ethylene glycol, and lauryl alcohol. Examples of solvents having a carboxyl group include organic acids, e.g., formic acid, acetic acid, propionic acid, benzoic acid, tartaric acid, oxalic acid, oleic acid, and stearic acid. Examples of solvents having a ketone group include acetone, methyl ethyl ketone, and methyl isobutyl ketone cyclohexanone.

After the washing with the organic solvent, the inside of the glass container is washed with pure water. At that time, it is desirable that the amount of the pure water is specified to be at least two times the volume of the container.

Furthermore, the present invention is the method for treating the inside surface of a glass container, wherein in the above-described sintering, the sintering temperature is 300° C. to 600° C. and the sintering time is 10 minutes or more.

In the sintering of polysilazane, it is desirable that the sintering temperature is specified to be 300° C. to 600° C. and the sintering time is 10 minutes or more.

If the sintering temperature is lower than 300° C., there is a possibility that a dense silicon dioxide coating of polysilazane is not formed. If sintering is effected at higher than 600° C., the glass container is deformed significantly and, thereby, becomes of no value as a product. A more preferable sintering temperature is 400° C. to 500° C.

If the sintering time is less than 10 minutes, there is a possibility that a dense silicon dioxide coating of polysilazane is not formed. The upper limit of the sintering time is not specifically limited, but an energy loss occurs.

The most preferable sintering time is 30 minutes to 3 hours.

The above-described method for treating the inside surface of a glass container according to the present invention can restrain alkali elution from the inside surface of the glass container without using a corrosive gas, e.g., a sulfur dioxide gas. Consequently, the inside surface treatment facility has no corrosion problem, there is no fear of deterioration of an operation environment due to leakage of a corrosive gas, and an exhaust gas treatment is unnecessary.

Furthermore, the present invention is a method for treating the inside surface of a glass container characterized by including the steps of applying at least one type of a sulfur dioxide gas, a sulfur trioxide gas, a chlorine gas, and a chlorofluorocarbon gas to the inside surface of the glass container under heating, cooling the glass container gradually, applying a polysilazane solution to the inside surface of the glass container, drying polysilazane while the glass container in the state of being inverted and inclined 50° to 70° is rotated, and sintering polysilazane.

It is desirable that the drying of polysilazane while the glass container in the state of being inverted and inclined 50° to 70° is rotated is performed at ambient temperature. After this step, the inside surface of a mouth portion of the glass container may be covered with polysilazane thick in some cases. At that time, wiping with a cloth or the like may be performed. After this drying at ambient temperature, it is desirable that drying at high temperature is performed (at about 100° C. to 180° C. for about 5 to 15 minutes). The drying time can be reduced by performing high-temperature drying.

Furthermore, the present invention is the method for treating the inside surface of a glass container, wherein in the applying of at least one type of a sulfur dioxide gas, a sulfur trioxide gas, a chlorine gas, and a chlorofluorocarbon gas to the inside surface of the above-described glass container, the average temperature of the glass container is 500° C. to 700° C.

Furthermore, the present invention is the method for treating the inside surface of a glass container, wherein in the above-described sintering, the sintering temperature is 300° C. to 600° C. and the sintering time is 10 minutes or more.

An alkali elution restraining effect is improved to a great extent by combining the treatment with a sulfur dioxide or the like and the polysilazane treatment.

The alkali elution restraining effect is poor when the inside surface of the glass container is subjected to the polysilazane treatment only.

In the case where the treatment with a sulfur dioxide or the like is performed, the alkali on the base material surface is reduced, so that the alkali does not diffuse into the polysilazane coating during formation of the coating, and the alkali is hardly present on the base material surface, so that the amount of diffusion into the formed silica based coating decreases and, as a result, the alkali elution is restrained.

Regarding the sulfur dioxide gas, the sulfur trioxide gas, the chlorine gas, and the chlorofluorocarbon gas, these gases may be applied directly to the glass surface, or substances (for example, ammonium sulfate), which generate these gases by heat, may be brought into contact with glass and gases thereby generated may be reacted with the glass.

It is appropriate that the average temperature of the glass when the sulfur dioxide gas or the like is applied is 500° C. to 700° C. If the average temperature is lower than 500° C., the reaction is not effected easily, and if 700° C. is exceeded, adverse influences, e.g., deformation of glass and roughening of surface, may be exerted.

This operation may be performed in a manner similar to that of the bloom treatment, the chlorofluorocarbon gas treatment, or a treatment based on combination of the bloom treatment and the chlorofluorocarbon gas treatment. For example, a still-hot glass bottle immediately after molding in a glass container production line can be subjected to the operation in the upstream side of a lehr.

Furthermore, the present invention is a glass container characterized by being subjected to the inside surface treatment according to the above-described method.

Advantageous Effects of Invention

According to the present invention, generation of a large thickness portion in polysilazane applied to the inside surface of the glass container can be prevented and foaming of a polysilazane coating can be prevented during sintering.

Moreover, the amount of alkali elution from the inside surface of the glass container is reduced to a great extent than ever by combining the washing treatment or the treatment with the sulfur trioxide gas and the polysilazane coating. Consequently, the amount of inclusion of alkali into the contents, e.g., chemicals, stored in the glass container is reduced and the quality of the contents can be improved.

BRIEF DESCRIPTION OF DRAWINGS

FIG. 11 is a diagram for explaining results of $SiO_2$ elution tests at 121° C.×5 h.

DESCRIPTION OF EMBODIMENTS

Example 1

Figure 1:
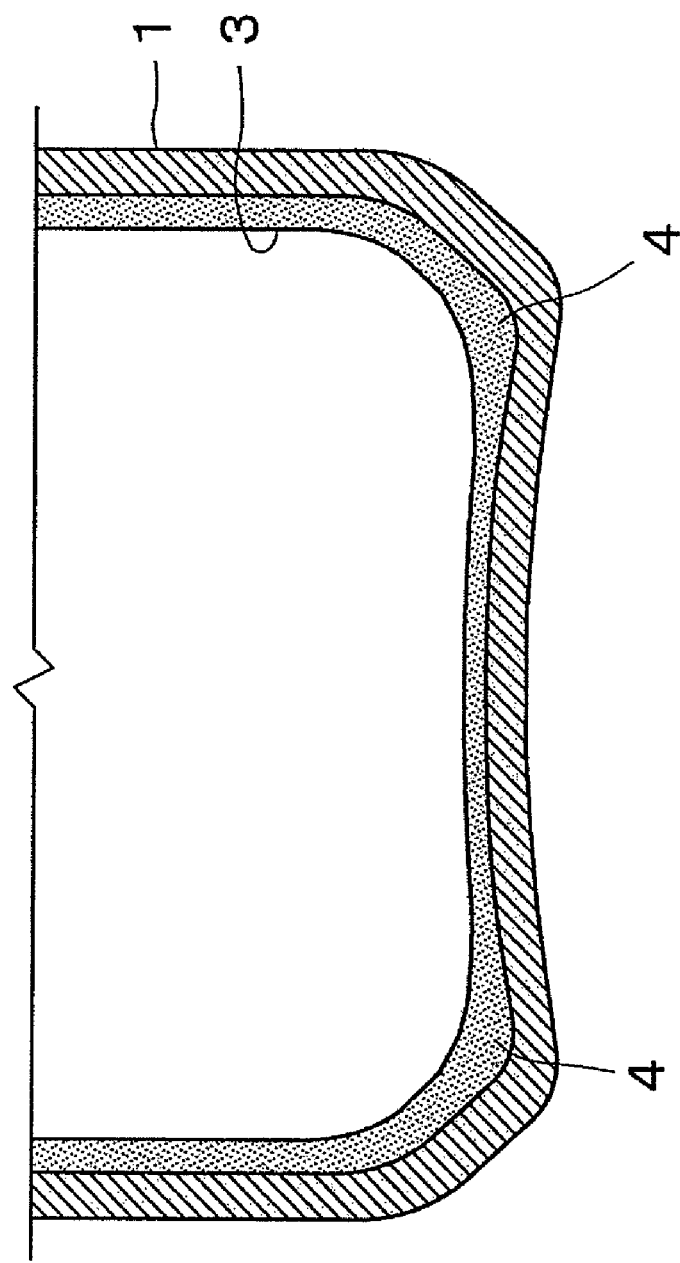
FIG. 1 is a diagram for explaining a polysilazane coating in the case where polysilazane is dried while a glass container is erected.
Figure 2:
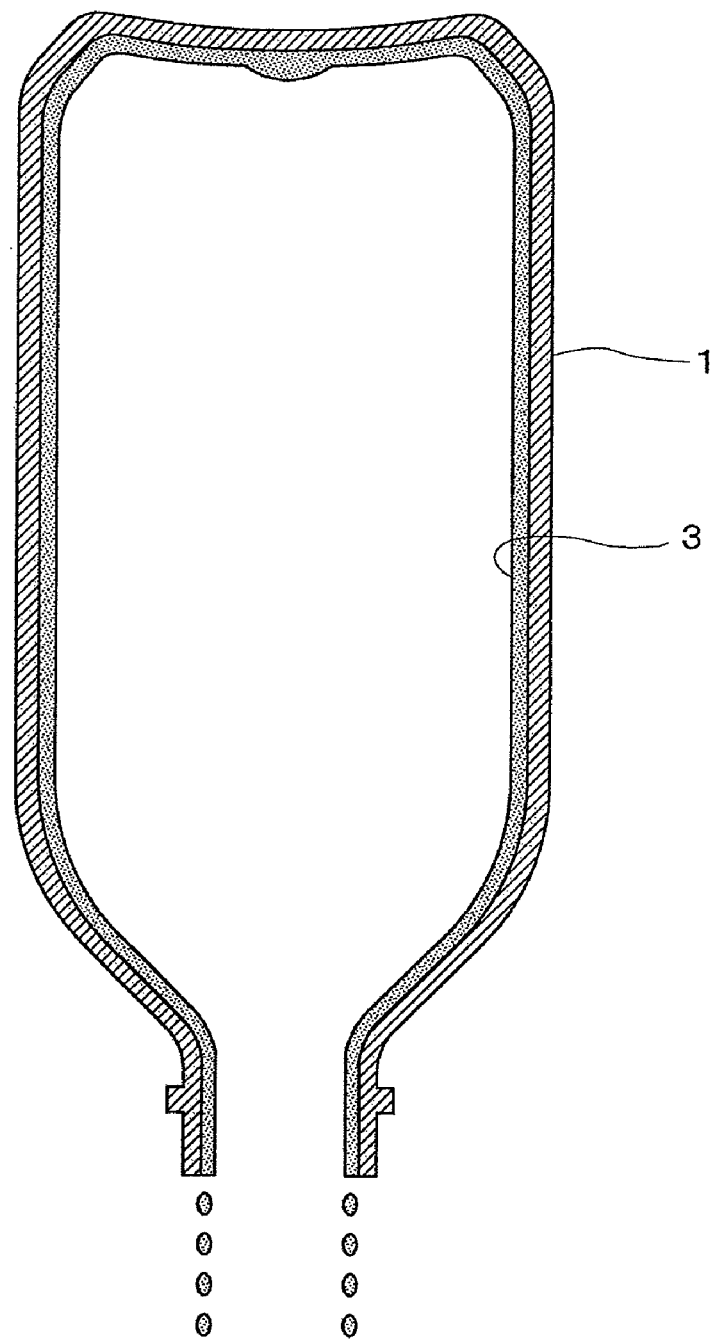
FIG. 2 is a diagram for explaining drying of polysilazane while a glass container is inverted.
Figure 3:
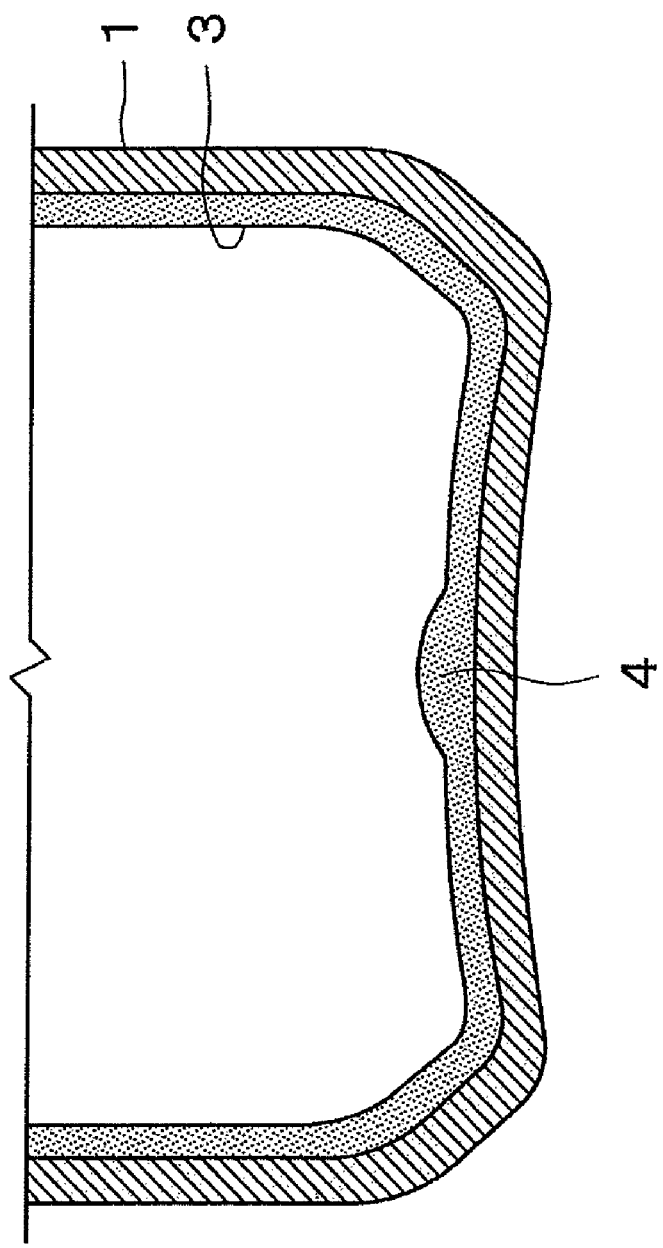
FIG. 3 is a diagram for explaining a polysilazane coating in the case where polysilazane is dried while a glass container is inverted.
Figure 4:
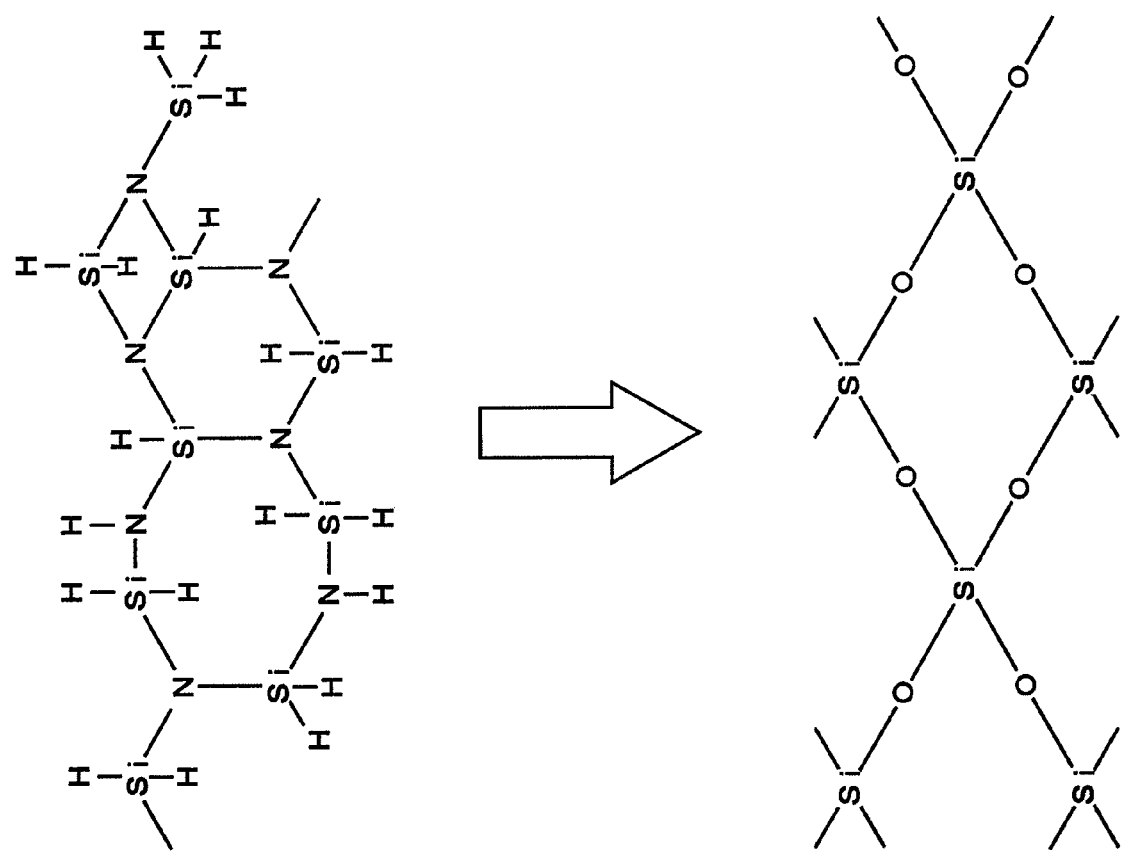
FIG. 4 is a diagram for explaining polysilazane and a silicon dioxide coating.
Figure 5:
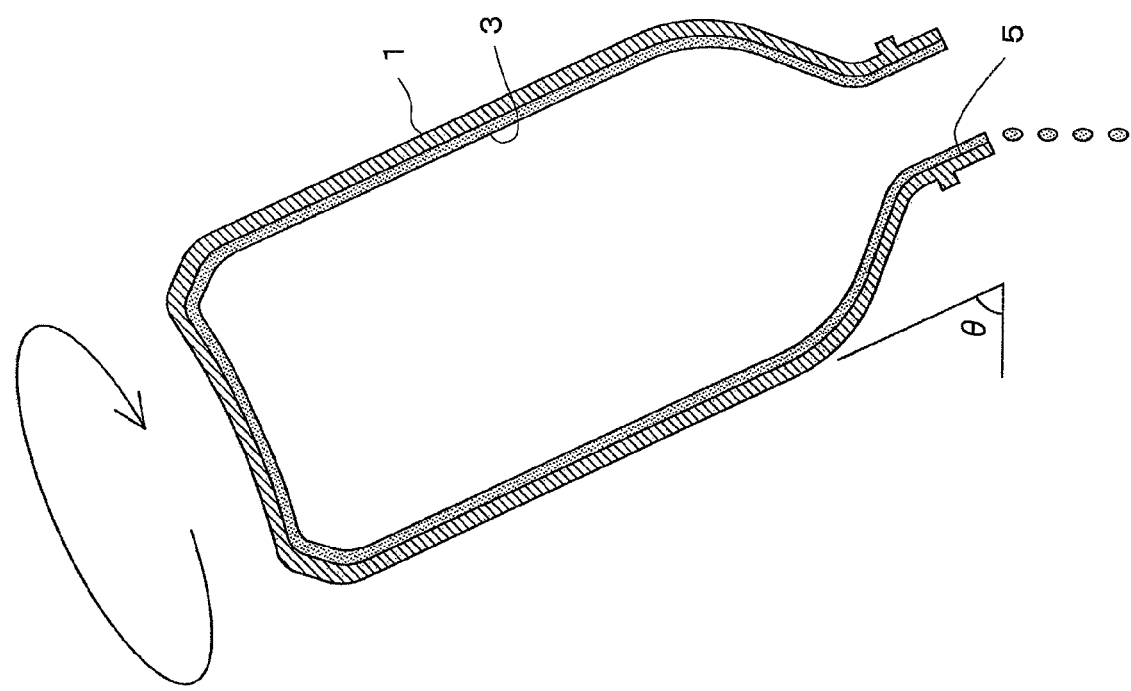
FIG. 5 is a diagram for explaining a step to dry polysilazane while the glass container in the state of being inverted and inclined 50° to 70° is rotated.
Figure 6:
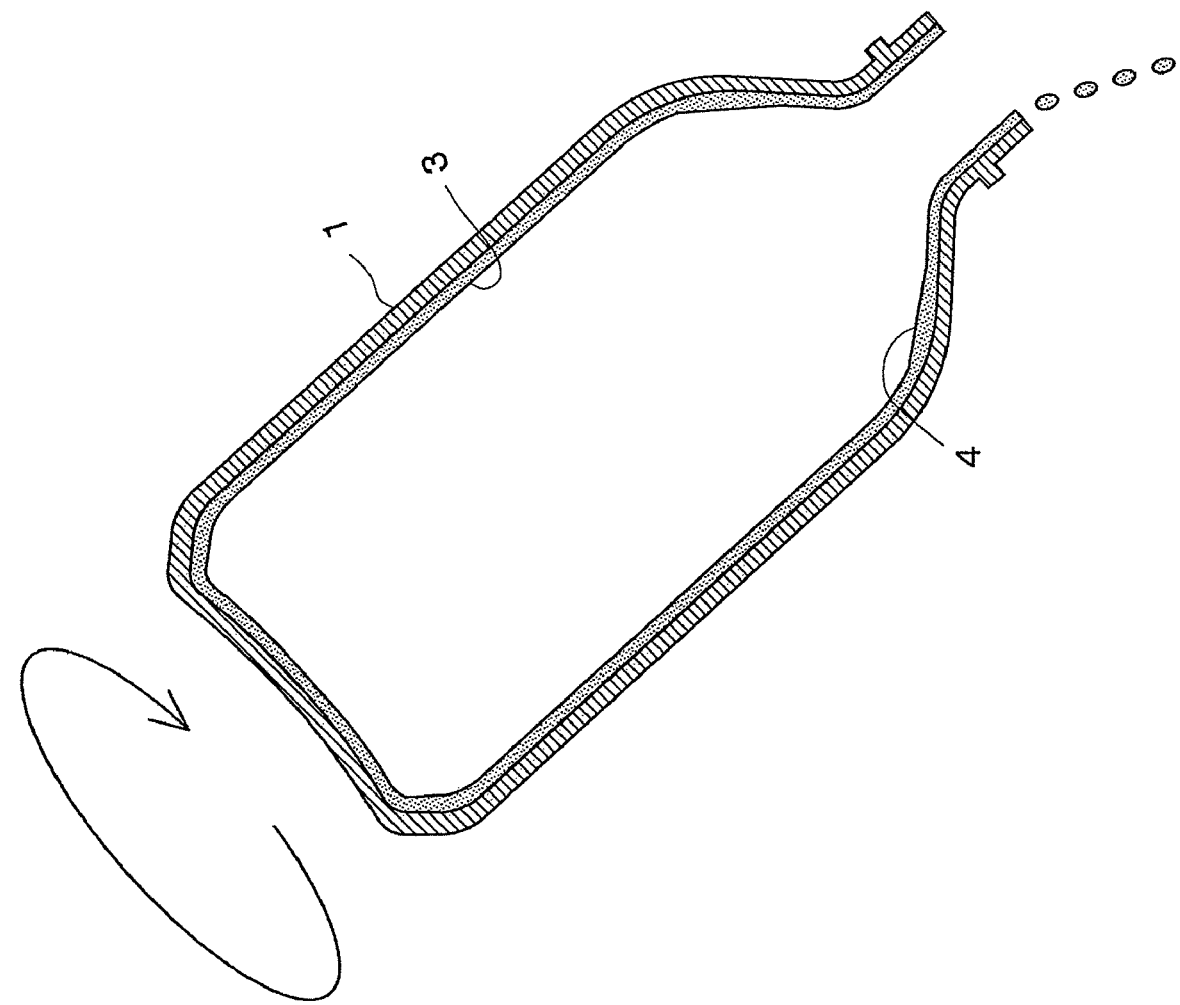
FIG. 6 is a diagram for explaining the case where polysilazane is dried while the glass container in the state of being inverted and inclined less than 50° is rotated.
Figure 7:
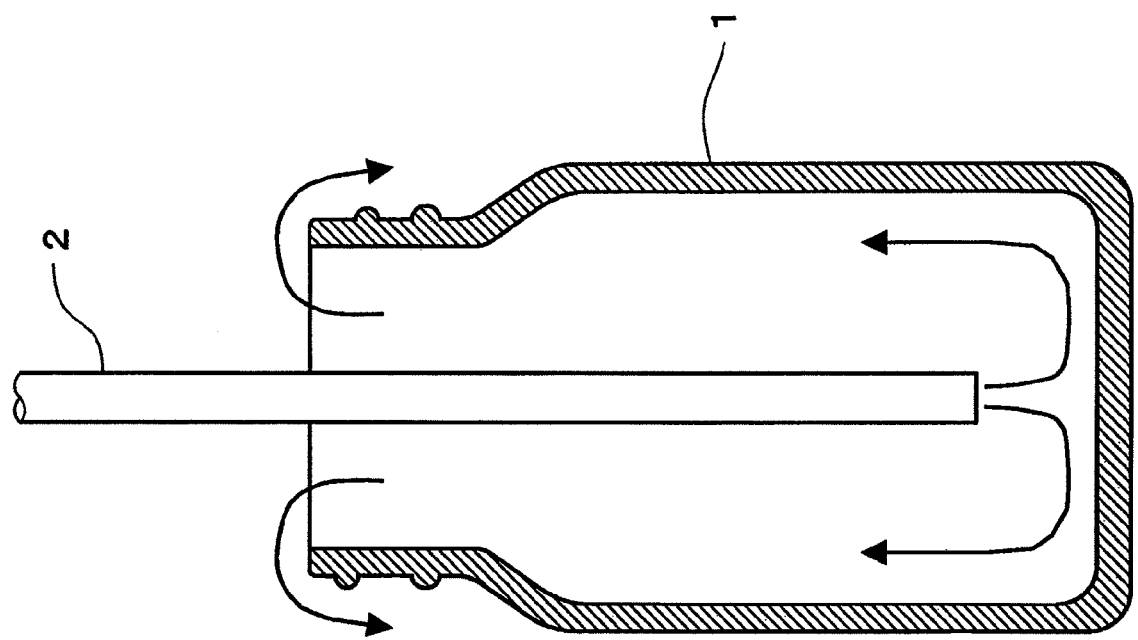
FIG. 7 is a diagram for explaining an example of a method for washing the inside surface of a glass container.

A glass container (bottle) having an internal volume of 100 ml was subjected to an inside surface treatment according to the present invention in a manner described below.

[Washing with Tap Water]

An operation to fill tap water into the inside of the glass container and discard the water (hereafter this operation is referred to as "rinsing") was repeated 3 times.

[Washing with Distilled Water]

Subsequently, the inside of the glass container was rinsed 3 times with distilled water.

[Drying]

Thereafter, in a drying oven, the glass container was brought into the state of being inverted and was dried at 80° C. for 30 minutes.

[Polysilazane Coating]

At room temperature, 3 ml of 1-percent by weight polysilazane (Polysilazane NN produced by AZ Electronic Materials)-containing solution, in which the diluent was xylene (GR Xylene produced by KANTO CHEMICAL CO., INC.), was put into the glass container, the inside of the container was coated thoroughly and, thereafter, an excess coating solution was discharged.

Subsequently, drying was performed at ambient temperature for 20 minutes while the glass container in the state of being inverted and inclined 60° was rotated 90° every 5 minutes intermittently. Dripping of an excess coating solution from the mouth portion of the glass container was stopped after 15 minutes.

[High-Temperature Drying]

Then, in the drying oven, the glass container was brought into the state of being inverted and was dried at a high temperature of 80° C. for 30 minutes.

In this regard, the drying step is not limited to this. The attitude of the container may be the state of being erected, and the drying method may be air drying.

[Sintering]

Thereafter, polysilazane was sintered at a sintering temperature of 500° C. for a sintering time of 3 hours.

After sintering was completed, the glass container was cooled gradually. Foaming of the coating film did not occur at all.

Example 2

The same glass container (bottle) having an internal volume of 100 ml as that in Example 1 was subjected to an inside surface treatment according to the present invention in a manner described below.

[Washing with Warm Water]

The inside of the glass container was rinsed once with warm water (ion-exchanged water) at 60° C.

[Washing with Tap Water]

Thereafter, the inside of the glass container was rinsed 3 times with tapped water.

[Washing with Distilled Water]

Subsequently, the inside of the glass container was rinsed 3 times with distilled water.

[Drying]

Then, in a drying oven, the glass container was brought into the state of being inverted and was dried at 80° C. for 30 minutes.

In this regard, the drying step is not limited to this. The attitude of the container may be the state of being erected, and the drying method may be air drying.

[Polysilazane Treatment]

Thereafter, as in Example 1 described above, application of polysilazane, drying, sintering, and gradual cooling were performed. Foaming of the coating film did not occur at all.

Example 3

The same glass container (bottle) having an internal volume of 100 ml as that in Example 1 was subjected to an inside surface treatment according to the present invention in a manner described below.

[Washing with Dilute Hydrochloric Acid Solution]

The inside of the glass container was rinsed once with 1-percent by mole dilute hydrochloric acid solution.

[Washing with Tap Water]

Thereafter, the inside of the glass container was rinsed 3 times with tapped water.

[Washing with Distilled Water]

Subsequently, the inside of the glass container was rinsed 3 times with distilled water.

[Drying]

Then, in a drying oven, the glass container was brought into the state of being inverted and was dried at 80° C. for 30 minutes.

In this regard, the drying step is not limited to this. The attitude of the container may be the state of being erected, and the drying method may be air drying.

[Polysilazane Treatment]

Thereafter, as in Example 1 described above, application of polysilazane, drying, sintering, and gradual cooling were performed. Foaming of the coating film did not occur at all.

Example 4

The inside surface of the same glass container (bottle) having an internal volume of 100 ml as that in Example 1 was subjected to the same polysilazane treatment (application of polysilazane, drying, sintering, and gradual cooling) as that in Examples 1 to 3 without performing the washing step. Foaming of the coating film did not occur at all.

[Elution Test]

The test was performed on the basis of the alkali elution second method of an glass container for injection (121° C.×1 h) in the Japanese Pharmacopoeia.

[Analysis of Amount of Alkali Elution]

The analysis was performed on the basis of atomic absorption analysis for Na.

Figure 8:
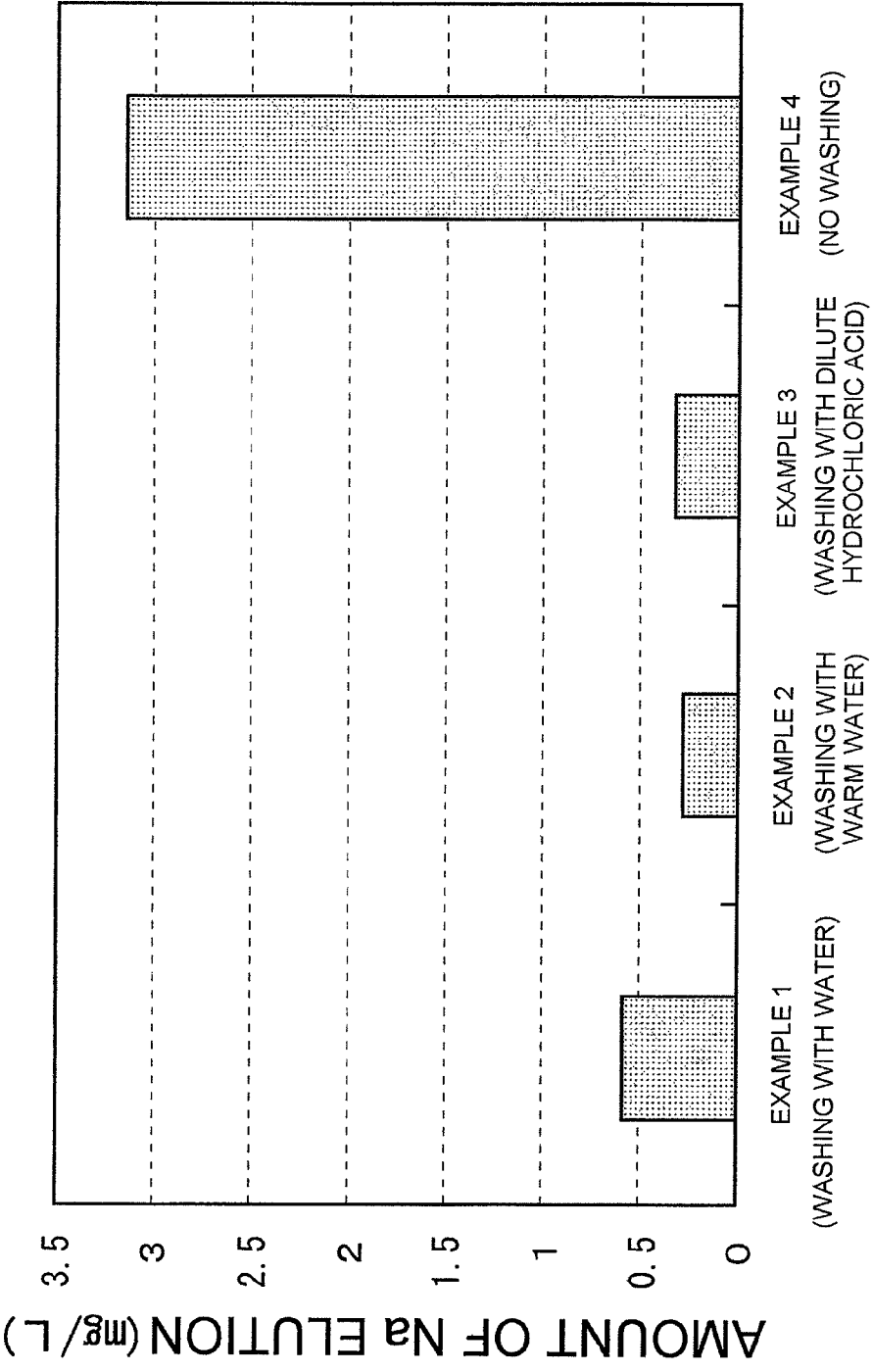
FIG. 8 is a diagram for explaining results of alkali elution tests of Examples 1 to 4.

FIG. 8 shows the results of alkali elution tests of Examples 1 to 4 at 121° C.×1 h.

Regarding each of Examples 1 to 3, the amount of alkali elution was small significantly as compared with that of Example 4 in which only the polysilazane treatment was performed without performing a washing step.

Among Examples, Example 2 shows the smallest amount of alkali elution, and then, the others are in the order of Example 3, Example 1, and Example 4.

In the case where the inside of the glass container was washed with the organic solvent having a polar group, an alkali elution restraining effect nearly equivalent to that in the case where washing with warm water was performed in Example 2 or in the case where washing with dilute hydrochloric acid solution was performed in Example 3 was exerted.

Example 5

A glass container (bottle) having an internal volume of 100 ml was subjected to the inside surface treatment according to the present invention in a manner described below.

[Sulfur Dioxide Gas Treatment]

Ammonium sulfate was put into the inside of the glass container, the glass was heated to 550° C., and the sulfur dioxide gas treatment was performed by the sulfur dioxide gas generated through the heating.

[Polysilazane Coating]

Subsequently, 3 ml of 1-percent by weight polysilazane (Polysilazane NN produced by AZ Electronic Materials)-containing solution, in which the diluent was xylene (GR Xylene produced by KANTO CHEMICAL CO., INC.), was put into the glass container cooled until the temperature reached nearly room temperature. The inside of the container was coated thoroughly and, thereafter, an excess coating solution was discharged.

Then, drying was performed at ambient temperature for 20 minutes while the glass container in the state of being inverted and inclined 60° was rotated 90° every 5 minutes intermittently. Dripping of an excess coating solution from the mouth portion of the glass container was stopped after 15 minutes.
[High-Temperature Drying]

Subsequently, in the drying oven, the glass container was brought into the state of being inverted and was dried at 150° C. for 10 minutes.

In this regard, the drying is not limited to this. The attitude of the container may be the state of being erected, and the drying method may be air drying.
[Number of Applications]

Each of glass containers, which were subjected to both of the above-described polysilazane coating and high-temperature drying step once, three times, five times, and seven times, was prepared.
[Sintering]

Thereafter, polysilazane was sintered.

The sintering temperatures of 400° C. and 500° C. were employed.

The sintering times were specified to be 30 minutes and 3 hours.

After sintering was completed, the glass container was cooled gradually. Foaming of the coating film did not occur at all.

Example 6

The same glass container (bottle) having an internal volume of 100 ml as that in Example 5 was subjected to an inside surface treatment of Example 6 in a manner described below without performing a sulfur dioxide gas treatment.
[Polysilazane Coating]

At room temperature, 3 ml of 1-percent by weight polysilazane (Polysilazane NN produced by AZ Electronic Materials)-containing solution, in which the diluent was xylene (GR Xylene produced by KANTO CHEMICAL CO., INC.), was put into the glass container. The inside of the container was coated thoroughly and, thereafter, an excess coating solution was discharged.

Then, drying was performed at ambient temperature for 20 minutes while the glass container in the state of being inverted and inclined 60° was rotated 90° every 5 minutes intermittently. Dripping of an excess coating solution from the mouth portion of the glass container was stopped after 15 minutes.
[High-Temperature Drying]

Subsequently, in the drying oven, the glass container was brought into the state of being inverted and was dried at 150° C. for 10 minutes.

In this regard, the drying is not limited to this. The attitude of the container may be the state of being erected, and the drying method may be air drying.
[Number of Applications]

Each of glass containers, which were subjected to both of the above-described polysilazane coating and high-temperature drying step once, three times, five times, and seven times, was prepared.
[Sintering]

Thereafter, polysilazane was sintered.
The sintering temperatures of 500° C. were employed.
The sintering time was specified to be 3 hours.

After sintering was completed, the glass container was cooled gradually. Foaming of the coating film did not occur at all.

Comparative Example

Ammonium sulfate was put into the inside of the same glass container (bottle) having an internal volume of 100 ml as that in Example 5, the glass was heated to 550° C., and the sulfur dioxide gas treatment was performed by the sulfur dioxide gas generated through the heating without performing a polysilazane treatment. The resulting glass container was taken as Comparative example.
[Elution Test]

The test was performed on the basis of the alkali elution second method of an glass container for injection (121° C.×1 h) in the Japanese Pharmacopoeia.

Furthermore, a test, in which the elution time was extended to 5 h, was also performed.
[Analysis]
(1) Amount of Alkali Elution The amount of Na elution was analyzed on the basis of atomic absorption analysis.
(2) Amount of $SiO_2$ elution The amount of $SiO_2$ elution was measured by using color development of molybdenum blue on the basis of 6.2.4 Operation (7) of 6. Method for quantifying silicon dioxide in JIS R3101 "Methods for chemical analysis of Soda-Lime-Magnesia-Silica glasses".

Figure 9:
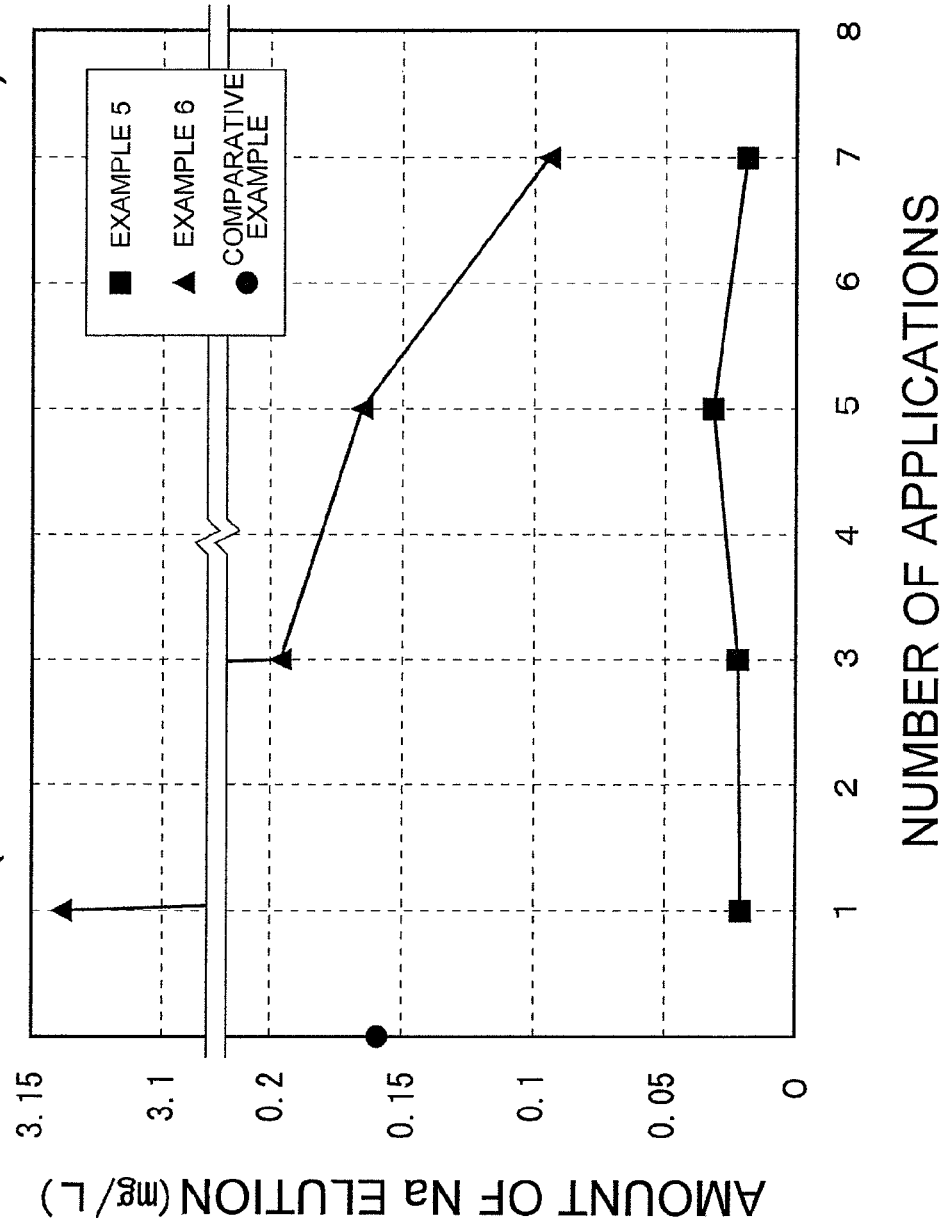
FIG. 9 is a diagram for explaining results of alkali elution tests at 121° C.×1 h.

FIG. 9 shows the results of alkali elution tests at 121° C.×1 h in Examples 5 and 6 and Comparative example.

In FIG. 9, a square point indicates Example 5, and each point is an average of one each of specimens with respect to the sintering temperatures of 400° C. and 500° C. (sintering times were 3 hours equally). In this regard, a difference between the specimens with respect to the sintering temperatures of 400° C. and 500° C. was hardly observed.

A triangular point indicates Example 6 (polysilazane treatment only), and each point is an average of two specimens.

A circular point indicates Comparative example (sulfur dioxide gas treatment only), and each point is an average of two specimens.

As is clear from FIG. 9, in Example 6 (polysilazane treatment only), the specimen with respect to the number of applications of once has a significantly poor alkali elution restraining effect, the amount of alkali elution regarding the number of applications of three times is about 10 times the amount of Example 5, and even the amount of the number of applications of seven times reaches about 5 times.

The amount of alkali elution of Comparative example (sulfur dioxide gas treatment only) is about 7.5 times the amount of Example 5.

Regarding Example 5, the amount of alkali elution is hardly changed depending on the number of applications. Therefore, it is enough that the number of applications is once.

As described above, Example 5, in which the sulfur dioxide gas treatment and the polysilazane treatment were combined, had a remarkable alkali elution restraining effect as compared with those of Example 6 (polysilazane treatment only) and Comparative example (sulfur dioxide gas treatment only). This is a synergetic effect which cannot be predicted from the result of the sulfur dioxide gas treatment only and the result of the polysilazane treatment only.

Figure 10:
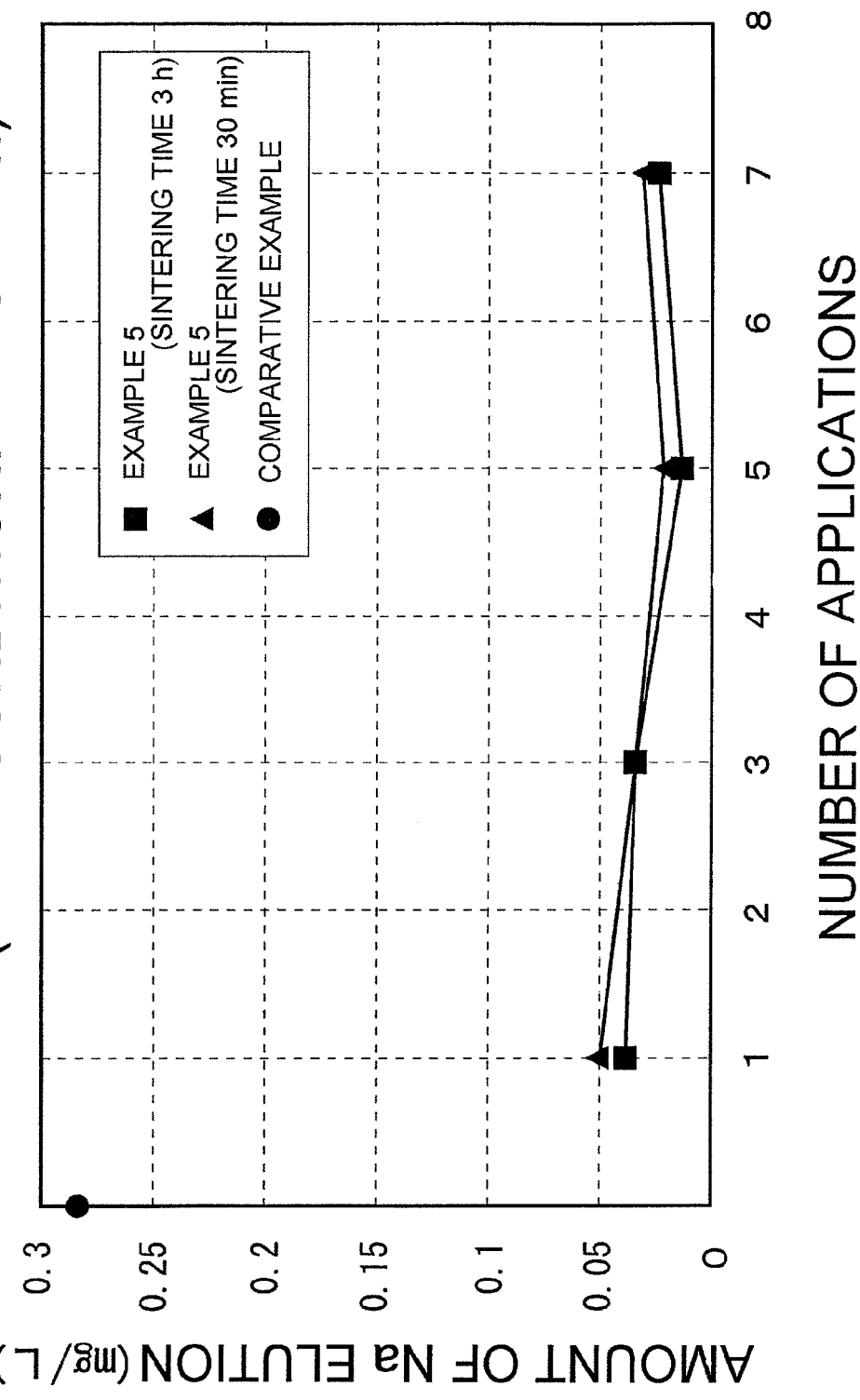
FIG. 10 is a diagram for explaining results of alkali elution tests at 121° C.×5 h.

FIG. 10 shows the results of alkali elution tests at 121° C.×5 h in Example 5 and Comparative example.

In FIG. 10, a square point indicates Example 5 with respect to the sintering temperature of 500° C. and the sintering time of 3 hours. Each point is an average of two specimens.

A triangular point indicates Example 5 with respect to the sintering temperature of 500° C. and the sintering time of 30 minutes. Each point is an average of two specimens.

A circular point indicates Comparative example (sulfur dioxide gas treatment only), and is an average of two specimens.

As shown in FIG. 10, there is almost no difference between the results of the sintering times of 30 minutes and 3 hours, and even 30 minutes are sufficient. The amount of alkali elution of Comparative example is about 6 times the amount of Example 5.

FIG. 11 shows the results of $SiO_2$ elution tests at 121° C.×5 h in Example 5 and Comparative example.

In FIG. 11, a square point indicates Example 5 with respect to the sintering temperature of 500° C. and the sintering time of 3 hours. Each point is an average of two specimens.

A triangular point indicates Example 5 with respect to the sintering temperature of 500° C. and the sintering time of 30 minutes. Each point is an average of two specimens.

A circular point indicates Comparative example (sulfur dioxide gas treatment only), and is an average of two specimens.

As shown in FIG. 11, there is almost no difference between the results of the sintering times of 30 minutes and 3 hours, even 30 minutes are sufficient, and $SiO_2$ is hardly eluted. The amount of $SiO_2$ elution of Comparative example is about 20 times the amount of Example 5.

As described above, the present invention is also excellent in $SiO_2$ elution restraining effect.

REFERENCE SIGNS LIST 1 glass container
2 water supply pipe
3 polysilazane
4 large thickness portion
5 inside surface of mouth portion

The invention claimed is:

1. A method for treating the inside surface of a glass container, the method comprising:
    applying a polysilazane solution to the inside surface of the glass container;
    drying the polysilazane while the glass container is rotated in the state of being inverted and inclined 50° to 70° with respect to horizontal; and
    sintering the polysilazane.

2. The method of claim 1, wherein in the sintering, the sintering temperature is 300° C. to 600° C. and the sintering time is 10 minutes or more.

3. A method for treating the inside surface of a glass container, the method comprising:
    washing the inside of the glass container with water, an acid solution, or an organic solvent;
    applying a polysilazane solution to the inside surface of the glass container;
    drying the polysilazane while the glass container is rotated in the state of being inverted and inclined 50° to 70° with respect to horizontal, and
    sintering the polysilazane.

4. The method of claim 3, wherein in the sintering, the sintering temperature is 300° C. to 600° C. and the sintering time is 10 minutes or more.

5. A method for treating the inside surface of a glass container, the method comprising:
    applying at least one of a sulfur dioxide gas, a sulfur trioxide gas, a chlorine gas, and a chlorofluorocarbon gas to the inside surface of the glass container under heating;
    cooling the glass container;
    applying a polysilazane solution to the inside surface of the glass container;
    drying the polysilazane while the glass container is rotated in the state of being inverted and inclined 50° to 70° with respect to horizontal; and
    sintering the polysilazane.

6. The method of claim 5, wherein in the applying of at least one type of a sulfur dioxide gas, a sulfur trioxide gas, a chlorine gas, and a chlorofluorocarbon gas to the inside surface of the glass container, the average temperature of the glass container is 500° C. to 700° C.

7. The method of claim 6, wherein in the sintering, the sintering temperature is 300° C. to 600° C. and the sintering time is 10 minutes or more.

8. The method of claim 2, wherein in the sintering, the sintering temperature is 300° C. to 600° C. and the sintering time is 10 minutes or more.

* * * * *

UNITED STATES PATENT AND TRADEMARK OFFICE
CERTIFICATE OF CORRECTION

PATENT NO.        : 8,389,052 B2
APPLICATION NO.   : 13/120485
DATED             : March 5, 2013
INVENTOR(S)       : Kazuyuki Shiozawa It is certified that error appears in the above-identified patent and that said Letters Patent is hereby corrected as shown below:

In the Claims:

Col. 12, Lines 41-43, delete

"The method of claim 2, wherein in the sintering, the sintering temperature is 300° C. to 600° C. and the sintering time is 10 minutes or more."

insert

-- The method of claim 5, wherein in the sintering, the sintering temperature is 300° C. to 600° C. and the sintering time is 10 minutes or more. --

Signed and Sealed this
Eighteenth Day of June, 2013

Teresa Stanek Rea
*Acting Director of the United States Patent and Trademark Office*